US008924975B2

(12) United States Patent
Memik et al.

(10) Patent No.: US 8,924,975 B2
(45) Date of Patent: Dec. 30, 2014

(54) CORE SELECTION FOR APPLICATIONS RUNNING ON MULTIPROCESSOR SYSTEMS BASED ON CORE AND APPLICATION CHARACTERISTICS

(75) Inventors: Gokhan Memik, Evanston, IL (US); Seda Ogrenci Memik, Evanston, IL (US); Bill Mangione-Smith, Kirkland, WA (US)

(73) Assignee: Empire Technology Development LLC, Wilmington, DE (US)

( * ) Notice: Subject to any disclaimer, the term of this patent is extended or adjusted under 35 U.S.C. 154(b) by 1057 days.

(21) Appl. No.: 12/508,552

(22) Filed: Jul. 23, 2009

(65) Prior Publication Data

US 2011/0023047 A1    Jan. 27, 2011

(51) Int. Cl.
G06F 9/46    (2006.01)
G01C 17/00    (2006.01)
G06F 9/48    (2006.01)

(52) U.S. Cl.
CPC .................................. *G06F 9/4843* (2013.01)
USPC ............................ 718/102; 718/104; 702/186

(58) Field of Classification Search
CPC ............................. G06F 9/5027; G06F 9/5044
USPC ....................................................... 718/104
See application file for complete search history.

(56) References Cited

U.S. PATENT DOCUMENTS 5,898,870 A * 4/1999 Okuda et al. .................. 718/104
5,930,511 A * 7/1999 Hinsley ......................... 717/164
6,021,076 A    2/2000 Woo et al.
6,298,370 B1    10/2001 Tang
6,772,352 B1    8/2004 Williams et al.
7,412,353 B2 * 8/2008 Borkar et al. ................. 702/186
7,516,344 B2    4/2009 Kato et al.
7,596,430 B2 * 9/2009 Aguilar et al. ............... 700/299
7,770,176 B2    8/2010 Maeda et al.
7,917,905 B2    3/2011 Itoh (Continued)

FOREIGN PATENT DOCUMENTS

CN    1993765 A    7/2007
CN    101275977 A    10/2008

(Continued)

OTHER PUBLICATIONS

Unsal, O. S., J. W. Tschanz, K. Bowman, V. De, X. Vera, A. Gonzalez, and O. Ergin, "Impact of Parameter Variations on Circuits and Microarchitecture." IEEE Micro, Nov.-Dec. 2006. 26(6): pp. 30-39.

(Continued)

*Primary Examiner* — Abdullah Al Kawsar
(74) *Attorney, Agent, or Firm* — Moritt Hock & Hamroff LLP; Steven S. Rubin, Esq.

(57) ABSTRACT

Techniques for scheduling an application program running on a multiprocessor computer system are disclosed. Example methods include but are not limited to analyzing first, second, third, and fourth core components for any within-die process variation, determining an operating state of the first, second, third and fourth core components, selecting optimum core components for each component type with the aid of bloom filters, statically determining which core component types are used by the application program, and scheduling the application program to run on a core having an optimum core component for a core component type used by the application program.

16 Claims, 4 Drawing Sheets

(56) References Cited

U.S. PATENT DOCUMENTS

| | | | |
|---|---|---|---|
| 7,954,101 | B2 | 5/2011 | Adachi et al. |
| 8,122,187 | B2 | 2/2012 | Walker et al. |
| 8,161,304 | B2 | 4/2012 | Hamilton |
| 2002/0112097 | A1 | 8/2002 | Milovanovic et al. |
| 2004/0193778 | A1 | 9/2004 | Ishikawa et al. |
| 2004/0199730 | A1 | 10/2004 | Eggers et al. |
| 2005/0120252 | A1 | 6/2005 | Uwatoko |
| 2005/0172289 | A1 | 8/2005 | Klingman |
| 2007/0191993 | A1 | 8/2007 | Wyatt |
| 2007/0260942 | A1* | 11/2007 | Rajwar et al. ............... 714/54 |
| 2007/0282572 | A1* | 12/2007 | Larus ........................... 703/2 |
| 2007/0294693 | A1 | 12/2007 | Barham |
| 2008/0005539 | A1* | 1/2008 | Velhal et al. ............... 712/220 |
| 2008/0103634 | A1 | 5/2008 | Santos et al. |
| 2008/0120485 | A1 | 5/2008 | Rothman et al. |
| 2008/0234953 | A1 | 9/2008 | Ignowski et al. |
| 2009/0055580 | A1 | 2/2009 | Moscibroda et al. |
| 2009/0055826 | A1* | 2/2009 | Bernstein et al. ........... 718/102 |
| 2009/0217286 | A1* | 8/2009 | Schmidbauer et al. ..... 718/105 |
| 2010/0064162 | A1* | 3/2010 | Rotem et al. ............... 713/340 |
| 2010/0250792 | A1* | 9/2010 | Harriman et al. ........... 710/22 |

FOREIGN PATENT DOCUMENTS

| | | |
|---|---|---|
| CN | 101278264 A | 10/2008 |
| JP | 2002189628 A | 7/2002 |
| JP | 2004355435 A | 12/2004 |
| JP | 2005165470 A | 6/2005 |
| JP | 2005174203 A | 6/2005 |
| JP | 2006209525 A | 8/2006 |
| JP | 2007265393 A | 10/2007 |
| JP | 2008112452 A | 5/2008 |
| JP | 2009510618 A | 3/2009 |

OTHER PUBLICATIONS

M. Goudarzi, T. Ishihara, H. Yasuura, "A Software Technique to Improve Yield of Processor Chips in Presence of Ultra-Leaky SRAM Cells Caused by Process Variation," In Proc. of Asia and South-Pacific Design Automation Conference (ASP-DAC'07), Japan, Jan. 2007, pp. 878-883.
Bjorn De Sutter, Variability-Aware PrOgram Relocation Project, Sep. 2008, 5 pages.
M. Goudarzi, T. Ishihara, Hiroto Yasuura, "Variation Aware Compilation for Improving Energy-Efficiency of Nanometer Processor Caches," Workshop on Compiler-Assisted SoC Assembly (CASA'06), Seoul, Oct. 27, 2006, 47 pages.
Memik, G. et al., "Self-Adjusting Architectures for Improved Performance, Yield, and Reduced Design Time", May 13, 2010, 4 pages.
Biswass et al., "Combining Static and Dynamic Defect-Tolerance Techniques for Nanoscale Memory Systems", Nov. 2007, ICCAD 2007, 6 pages.
Chun et al., "Shapeshifter: Dynamically Changing Pipeline Width and Speed to Address Process Variations", Nov. 2008, MICRO 2008, pp. 411-422, 12 pages.
Kannan et al., "Power Reduction of Functional Units Considering Temperature and Process Variations", Jan. 2008, Proceedings of the 21st International Conference on VLSI Design, 6 pages.
International Search Report dated Nov. 12, 2010 in International Application No. PCT/US10/39939.
International Search Report dated Nov. 19, 2010 in International Application No. PCT/US10/39933.
G. Memik, S. Memik, Y. Ismail, and R. Joseph, "Self-Adjusting Architectures/Circuits for Improved Performance and Reduced Design Complexity", NSF Grant #0541337, Apr. 2006, 4 pages.
M. Santambrogio, M. Giani, S. Ogrenci Memik, "Managing Reconfigurable Resources in Heterogeneous Cores using Portable Pre-Synthesized Templates", in Proc. International Symposium on System-on-Chip, Nov. 19-21, 2007, Tampere, Finland, 4 pages.
Y. Pan, J. Kong, S. Ozdemir, G. Memik, S. W. Chung, "Selective Wordline Voltage Boosting for Caches to Manage Yield under Process Variations", in Proc. of Design Automation Conference (DAC), San Francisco, CA, Jul. 2009, pp. 1-6.
A. Das, B. Ozisikyilmaz, S. Ozdemir, G. Memik, J. Zambreno, A. Choudhary, "Evaluating the Effects of Cache Redundancy on Profit", in Proc. of International Symposium on Microarchitecture (MICRO), Lake Como, Italy, Nov. 2008, pp. 1-11.
A. Mallik, Y. Zhang, G. Memik, "Automated Task Distribution in Multicore Network Processors using Statistical Analysis", in Proc. of International Symposium on Architectures for Networking and Communications Systems (ANCS), Orlando, FL, Dec. 2007, pp. 67-76.
S. Ozdemir, J. C. Ku, A. Mallik, G. Memik, Y. Ismail, "Variable Latency Caches for Nanoscale Processor", in Proc. of Conference for High Performance Computing, Networking, Storage and Analysis (SC), Reno, NV, Nov. 2007, 10 pages.
A. Das, S. Ozdemir, G. Memik, A. Choudhary, "Evaluating Voltage Islands in CMPs under Process Variations", in Proc. of 25th International Conference on Computer Design (ICCD), Lake Tahoe, CA, Oct. 2007, 8 pages.
B. Lin, A. Mallik, P. Dinda, G. Memik, R. Dick, "Power Reduction Through Measurement and Modeling of Users and CPUs", in Proc. of International Conference on Measurement and Modeling of Computer Systems (SIGMETRICS), San Diego, CA, Jun. 2007, 2 pages.
A. Das, S. Ozdemir, G. Memik, Joseph Zambreno and A. Choudhary, "Mitigating the Effects of Process Variations: Architectural Approaches for Improving Batch Performance", in Proc. of Workshop on Architectural Support for Gigascale Integration (ASGI) held in conjunction with International Symposium on Computer Architecture (ISCA), San Diego, CA, Jun. 2007, 11 pages.
Abhishek Das, Serkan Ozdemir, Gokhan Memik, Joseph Zambreno and Alok Choudhary, "Microarchitectures for Managing Chip Revenues under Process Variations", IEEE Computer Architecture Letters (CAL), vol. 6, Jun. 2007, pp. 1-4.
S. Ozdemir, D. Sinha, G. Memik, J. Adams, H. Zhou, "Yield-Aware Cache Architectures", in Proc. of International Symposium on Microarchitecture (MICRO), Orlando, FL, Dec. 2006, 11 pages.
J. Long, S. O. Memik, G. Memik, R. Mukherjee, "Thermal Monitoring Mechanisms for Chip Multiprocessors", ACM Transactions on Architecture and Code Optimization (TACO), vol. 5, No. 2, Aug. 2008, pp. 9:1 through 9:33.
S. Liu, Y. Zhang, S. Ogrenci Memik, G. Memik, "An Approach for Adaptive DRAM Temperature and Power Management", in Proc. of International Conference on Supercomputing (ICS), Island of Kos, Greece, Jun. 2008, pp. 63-72.
S. Liu, Y. Zhang, S. Ogrenci Memik, G. Memik, "A Power and Temperature Aware DRAM Architecture", in Proc. of Design Automation Conference (DAC), Anaheim, CA, Jun. 2008, 6 pages.
R. Mukherjee, S. Ogrenci Memik, "Physical Aware Frequency Selection for Dynamic Thermal Management in Multi-Core Systems", in Proc. of IEEE/ACM International Conference on Computer-Aided Design (ICCAD), Nov. 5-9, 2006, San Jose, CA, pp. 547-552.
Iyer, J. et al., "System Memory Power and Thermal Management in Platforms Built on Intel® Centrino® Duo Mobile Technology", Intel® Technology Journal, vol. 10, Issue 02, May 15, 2006, pp. 123-132.
Zhu, Q. et al., "Thermal Managerment of High Power Memory Module for Server Platforms", IEEE, 2008, pp. 572-576.
Canturk Isci, Alper Buyuktosunoglu, Chen-Yong Cher, Pradip Bose, Margaret Martonosi, "An Analysis of Efficient Multi-Core Global Power Management Policies: Maximizing Performance for a Given Power Budget", MICRO 2006: 347-358.
Abella, J., Vera, X., Gonzalez, A., "Penelope: The NBTI-Aware Processor", MICRO 2007, pp. 85-96.
Kevin Brownell, Gu-Yeon Wei and David Brooks. "Evaluation of Voltage Interpolation to Address Process Variations," International Conference on Computer Aided Design (ICCAD), San Jose, CA, Nov. 2008, 8 pages.
Xiaoyao Liang, Gu-Yeon Wei, and David Brooks. "ReVIVaL: A Variation-Tolerant Architecture Using Voltage Interpolation and Variable Latency," 35th International Symposium on Computer Architecture (ISCA-35), Beijing, China, Jun. 2008, 12 pages.
Xiaoyao Liang and David Brooks. "Mitigating the Impact of Process Variations on Processor Register Files and Execution Units," 39th

(56) References Cited

OTHER PUBLICATIONS

International Symposium on Microarchitecture (MICRO-39), Orlando, FL, Dec. 2006, 11 pages.

Abhishek Tiwari, Smruti Sarangi, and Josep Torrellas, "ReCycle: Pipeline Adaptation to Tolerate Process Variation", 34th Annual International Symposium on Computer Architecture (ISCA), Jun. 2007, 12 pages.

Bowman, K.A., Duvall, S.G., Meindl, J.D., "Impact of die-to-die and within-die parameter fluctuations on the maximum clock frequency distribution", ISSCC 2001, pp. 278-279.

S. Borkar, "Designing reliable systems from unreliable components: the challenges of transistor variability and degradation", IEEE Micro, 2005, pp. 10-16.

P. Ndai et al., "Within-Die Variation-Aware Scheduling in Superscalar Processors for Improved Throughput", IEEE Transactions on Computers, 2008, pp. 940-951.

Michael D. Powell, Arijit Biswas, Shantanu Gupta, and Shubhendu S. Mukherjee, "Architectural Core Salvaging in a Multi-Core Processor for Hard-Error Tolerance", in Proc. of International Symposium on Computer Architecture (ISCA), Austin, TX, Jun. 2009, 12 pages.

Ke Meng, Russ Joseph, "Process variation aware cache leakage management", ISLPED 2006: 262-267.

Ke Meng, Frank Huebbers, Russ Joseph, Yehea Ismail, "Modeling and Characterizing Power Variability in Multicore Architectures", ISPASS 2007: 146-157.

Ke Meng, Frank Huebbers, Russ Joseph, and Yehea Ismail, "Physical Resource Matching Under Power Asymmetry", in Proc. of P=ac2 2006, pp. 1-10.

Ke Meng, Russ Joseph, Robert P. Dick, Li Shang, "Multi-optimization power management for chip multiprocessors", PACT 2008: 177-186.

Somnath Paul, Saibal Mukhopadhyay and Swarup Bhunia, "A Variation-Aware Preferential Design Approach for Memory Based Reconfigurable Computing," in IEEE International Conference on Computer Aided Design (ICCAD), 2009, pp. 180-183.

J.A. Winter and D.H. Albonesi, "Scheduling Algorithms for Unpredictably Heterogeneous CMP Architectures", in Proc. of 38th International Conference on Dependable Systems and Networks, Jun. 2008, 10 pages.

Eren Kursun and Chen-Yong Cher, "Variation-aware thermal characterization and management of multi-core architectures", in Proc. of ICCD 2008, pp. 280-285.

Ulya R. Karpuzcu, Brian Greskamp and Josep Torrellas, "The BubbleWrap Many-Core: Popping Cores for Sequential Acceleration", International Symposium on Microarchitecture (MICRO), Dec. 2009, 12 pages.

Smruti Sarangi, Brian Greskamp, Abhishek Tiwari, and Josep Torrellas, "EVAL: Utilizing Processors with Variation-Induced Timing Errors", 41st International Symposium on Microarchitecture (MICRO), Nov. 2008, 12 pages.

Radu Teodorescu and Josep Torrellas, "Variation-Aware Application Scheduling and Power Management for Chip Multiprocessors", 35th Annual International Symposium on Computer Architecture (ISCA), Jun. 2008, 12 pages.

Bower F. A., Sorin D. J., and Cox L. P., "The Impact of Dynamically Heterogeneous Multicore Processors on Thread Scheduling", IEEE Micro 28, May 3, 2008, pp. 17-25.

Tam D., Azimi R., and Stumm M., "Thread clustering: sharing-aware scheduling on SMP-CMP-SMT multiprocessors", In Proceedings of the Sigops/Eurosys European Conference on Computer Systems. Lisboa, Portugal. Mar. 2007, 12 pages.

Anderson J.H., Calandrino J.M., Devi U.C., "Real-Time Scheduling on Multicore Platforms", In Proceedings of the Real-Time and Embedded Technology and Applications Symposium. Apr. 2006, 12 pages.

Durbhakula M., "Sharing-aware OS scheduling algorithms for multi-socket multi-core servers", In Proceedings of the international Forum on Next-Generation Multicore/Manycore Technologies. Cairo, Egypt. Nov. 2008, 10 pages.

Siddha S., Pallipadi V., Mallick A., "Process Scheduling Challenges in the Era of Multi-Core Processors", Intel® Technology Journal. Nov. 2007, 361-370.

Li T., Baumberger D., and Hahn S., "Efficient and scalable multiprocessor fair scheduling using distributed weighted round-robin", In Proceedings of the Symposium on Principles and Practice of Parallel Programming. Raleigh, NC. Feb. 2009, pp. 1-10.

Rajagopalan M., Lewis B. T., and Anderson T. A., "Thread scheduling for multi-core platforms", In Proceedings of the USENIX Workshop on Hot Topics in Operating System. San Diego, CA. May 2007, 9 pages.

El-Moursy A., Garg R., Albonesi D.H., Dwarkadas S., "Compatible phase co-scheduling on a CMP of multi-threaded processors", In Proceedings of the Parallel and Distributed Processing Symposium. Apr. 2006, pp. 1-10.

Puppin D., Stephenson M., Amarasinghe S., Martin M., and O'reilly U., "Adapting convergent scheduling using machine-learning", In proceedings of the International workshop on languages and compilers for parallel computing. Oct. 2003, 15 pages.

Negi A., Kishore K.P. "Applying Machine Learning Techniques to Improve Linux Process Scheduling", IEEE TENCON. Nov. 2005, 6 pages.

Wang Z., and O'Boyle M. F., "Mapping parallelism to multi-cores: a machine learning based approach", In Proceedings of the Symposium on Principles and Practice of Parallel Programming. Raleigh, NC. Feb. 2009, 10 pages.

Tucker A., and Gupta A., "Process control and scheduling issues for multiprogrammed shared-memory multiprocessors", In Proceedings of the Symposium on Operating Systems Principles. 1989, pp. 159-166.

Jiang Lin, Hongzhong Zheng, Zhichun Zhu, Eugene Gorbatov, Howard David, Zhao Zhang, "Software thermal management of dram memory for multicore systems", SIGMETRICS 2008: 337-348.

Jiang Lin, Hongzhong Zheng, Zhichun Zhu, Howard David, Zhao Zhang, "Thermal modeling and management of DRAM memory systems", ISCA 2007: 312-322.

Hongzhong Zheng, Jiang Lin, Zhao Zhang, Eugene Gorbatov, Howard David, Zhichun Zhu, "Mini-rank: Adaptive DRAM architecture for improving memory power efficiency", MICRO 2008: 210-221.

Hongzhong Zheng, Jiang Lin, Zhao Zhang, Zhichun Zhu, "Memory Access Scheduling Schemes for Systems with Multi-Core Processors", ICPP 2008: 406-413.

Hongzhong Zheng, Jiang Lin, Zhao Zhang, Zhichun Zhu, "Decoupled DIMM: building high-bandwidth memory system using low-speed DRAM devices", ISCA 2009: 255-266.

Engin Ipek, Onur Mutlu, José F. Martínez, and Rich Caruana, "Self Optimizing Memory Controllers: A Reinforcement Learning Approach", Proceedings of the 35th International Symposium on Computer Architecture (ISCA), pp. 39-50, Beijing, China, Jun. 2008.

Russ Joseph, "Exploring Salvage Techniques for Multi-core Architectures", HPCRI-2005 Workshop in Conjunction with HPCA-2005, 6 pages.

Seda Memik, Gokhan Memik, "SHF: Small: Thermal-Aware High-Performance DRAM Architectures in Multicore Technologies", NSF Grant# 0916746, Sep. 2009, 2 pages.

Gokhan Memik, "CAREER: Holistic Computer Architectures for Nanoscale Processors", NSF Grant#0747201, Apr. 2008, 3 pages.

Sahoo, S.K., et al., "Using Likely Program Invariants to Detect Hardware Errors", Appears in Proceedings of the 38th International Conference on Dependable Systems and Networks (DSN), Jun. 2008, pp. 1-10.

Ernst, D. et al., "Razor: A Low-Power Pipeline Based on Circuit-Level Timing Speculation", Appears in the 36th Annual International Symposium on Microarchitecture (MICRO-36), 12 pages.

Choi, J. et al., "Thermal-aware Task Scheduling at the System Software Level", ISLPED '07, Aug. 27-29, 2007, Portland, OR, pp. 213-218.

B. Lin, A. Mallik, P. Dinda, G. Memik, R. Dick, "User- and Process-Driven Dynamic Voltage and Frequency Scaling", in Proc. of International Symposium on Performance Analysis of Systems and Software (ISPASS), Boston, MA, Apr. 2009, 12 pages.

(56) References Cited

OTHER PUBLICATIONS

Abhishek Das, David Nguyen, Joseph Zambreno, Gokhan Memik, Alok Choudhary, "An FPGA-based Network Intrusion Detection Architecture", IEEE Transactions on Information Forensics and Security (TIFS), vol. 3, Issue 1, Mar. 2008, pp. 118-132.

S. Pati, R. Narayanan, G. Memik, A. Choudhary, J. Zambreno, "Design and Implementation of an FPGA Architecture for High-Speed Network Feature Extraction", in Proc. of International Conference on Field-Programmable Technology (FPT), Kitakyushu, Japan, Dec. 2007, 8 pages.

D. Nguyen, A. Das, G. Memik, A. Choudhary, "A Reconfigurable Architecture for Network Intrusion Detection using Principal Component Analysis", in Proc. of Fourteenth International Symposium on Field-Programmable Gate Arrays (FPGA), Monterey, CA, Feb. 2006, 2 pages.

D. Nguyen, G. Memik, S. Ogrenci Memik, A. Choudhary, "Real-Time Feature Extraction for High Speed Networks", in Proc. of International Conference on Field Programmable Logic and Applications (FPL), Tampere, Finland, Aug. 2005.

D. Nguyen, J. Zambreno, G. Memik, "Flow Monitoring in High-Speed Networks with 2D Hash Tables", in Proc. of Field-Programmable Logic and its Applications (FPL), Antwerp, Belgium, Aug.-Sep. 2004, 5 pages.

A. Shye, Y. Pan, B. Scholbrock, J. S. Miller, G. Memik, P. Dinda, R. Dick, "Power to the People: Leveraging Human Physiological Traits to Control Microprocessor Frequency", in Proc. of International Symposium on Microarchitecture (MICRO), Lake Como, Italy, Nov. 2008, 12 pages.

A. Shye, B. Ozisikyilmaz, A. Mallik, G. Memik, P. Dinda, R. Dick, A. Choudhary, "Learning and Leveraging the Relationship between Architecture-Level Measurements and Individual User Satisfaction", in Proc. of International Symposium on Computer Architecture (ISCA), Beijing, China, Jun. 2008, 12 pages.

A. Mallik, J. Cosgrove, R. Dick, G. Memik, P. Dinda, "PICSEL: Measuring User-Perceived Performance to Control Dynamic Frequency Scaling", in Proc. of Architectural Support for Programming Languages and Operating Systems (ASPLOS), Seattle, WA, Mar. 2008, pp. 70-79.

P. Dinda, G. Memik, R. Dick, B. Lin, A. Mallik, A. Gupta, S. Rossoff, "The User in Experimental Computer Systems Research", in Proc. of FCRC Workshop on Experimental Computer Science (ExpCS), San Diego, CA, Jun. 2007, pp. 1-12.

Arindam Mallik, Bin Lin, Gokhan Memik, Peter Dinda, Robert Dick, "User-Driven Frequency Scaling", IEEE Computer Architecture Letters (CAL), vol. 5, No. 2, 2006, 4 pages.

R. Schweller, Z. Li, Y. Chen, Y. Gao, A. Gupta, Y. Zhang, P. Dinda, M. Kao, G. Memik, "Reversible Sketches: Enabling Monitoring and Analysis over High-speed Data Streams", IEEE/ACM Transactions on Networking (ToN), vol. 15, No. 5, Oct. 2007, pp. 1059-1072.

R. Schweller, Z. Li, Y. Chen, Y. Gao, A. Gupta, Y. Zhang, P. Dinda, M. Kao, G. Memik, "Reverse Hashing for High-speed Network Monitoring: Algorithms, Evaluation, and Applications", in Proc. of 25th Annual Joint Conference of the IEEE Computer and Communications Societies (INFOCOM), Barcelona, Spain, Apr. 2006, 12 pages.

A. Mallik, B. Lin, P. Dinda, G. Memik, R. Dick, "Process and User Driven Dynamic Voltage and Frequency Scaling". Tech. Rep. NWU-EECS-06-11, Department of Electrical Engineering and.Computer Science, Northwestern University, Aug. 2006, 18 pages.

Ja Chun Ku, Serkan Ozdemir, Gokhan Memik, Yehea Ismail, "Thermal Management of On-Chip Caches through Power Density Minimization", IEEE Transactions on Very Large Scale Integration Systems (VLSI), vol. 15, Issue 5, pp. 592-604, May 2007.

J. C. Ku, S. Ozdemir, G. Memik, Y. Ismail, "Power Density Minimization for Highly-Associative Caches in Embedded Processors", in Proc. of Great Lakes Symposium on VLSI (GLSVLSI), Philadelphia, PA, Apr.-May 2006, pp. 100-104.

J. C. Ku, S. Ozdemir, G. Memik, Y. Ismail, "Thermal Management of On-Chip Caches Through Power Density Minimization", in Proc. of International Symposium on Microarchitecture (MICRO), Barcelona, Spain, Nov. 2005, 11 pages.

Y. Liu, G. Memik, G. Reinman, "Reducing the Energy of Speculative Instruction Schedulers", in Proc. of International Conference on Computer Design (ICCD), San Jose, CA, Oct. 2005, 6 pages.

Y. Liu, A. Shayesteh, G. Memik, G. Reinman, "Tornado Warning: the Perils of Selective Replay in Multithreaded Processors", in Proc. of International Conference on Supercomputing (ICS), Boston, MA, Jun. 2005, 10 pages.

G. Chen, Mahmut T. Kandemir, Mary Jane Irwin, Gokhan Memik, "Compiler-directed selective data protection against soft errors". ASP-DAC 2005: 713-716.

Rajarshi Mukherjee, Seda Ogrenci Memik, Gokhan Memik, "Temperature-aware resource allocation and binding in high-level synthesis". DAC 2005: 196-201.

Gokhan Memik, Glenn Reinman, William H. Mangione-Smith, "Precise Instruction Scheduling", Journal of Instruction-Level Parallelism (JILP), vol. 7, Jan. 2005, pp. 1-21.

Y. Liu, A. Shayesteh, G. Memik, G. Reinman, "The Calm Before the Storm: Reducing Replays in the Cyclone Scheduler", in Proc. of P=ac2: First Watson Conference on Interaction between Architecture, Circuits, and Compilers (P=ac2), Yorktown Heights, NY, Oct. 2004, 8 pages.

Y. Liu, A. Shayesteh, G. Memik, G. Reinman, "Scaling the Issue Window with Look-Ahead Latency Prediction", in Proc. of International Conference on Supercomputing (ICS), Saint-Malo, France, Jun.-Jul. 2004, pp. 217-226.

Rajarshi Mukherjee, Seda Ogrenci Memik, Gokhan Memik, "Peak temperature control and leakage reduction during binding in high level synthesis", ISLPED 2005: 251-256.

Gokhan Memik, Mahmut T. Kandemir, Ozcan Ozturk, "Increasing Register File Immunity to Transient Errors", Date 2005: 586-591.

Gokhan Memik, Masud H. Chowdhury, Arindam Mallik, Yehea I. Ismail, "Engineering Over-Clocking: Reliability-Performance Trade-Offs for High-Performance Register Files". DSN 2005: 770-779.

Arindam Mallik, Gokhan Memik, "A Case for Clumsy Packet Processors", MICRO 2004: 147-156.

Gokhan Memik, Mahmut T. Kandemir, Alok N. Choudhary, Ismail Kadayif, "An Integrated Approach for Improving Cache Behavior", Date 2003: 10796-10801.

Gokhan Memik, William H. Mangione-Smith, "Increasing power efficiency of multi-core network processors through data filtering", Cases 2002: 108-116.

Gokhan Memik, Mahmut T. Kandemir, Wei-Keng Liao, Alok Choudhary, "Multi-Collective I/O: A technique for exploiting inter-file access patterns", ACM Transactions on Storage (ToS), vol. 2, Issue 3, pp. 349-369, Aug. 2006.

G. Memik, M. Kandemir, A. Mallik, "Load Elimination for Low-Power Embedded Processors", in Proc. of Great Lakes Symposium on VLSI (GLSVLSI), Chicago, IL, Apr. 2005, pp. 282-285.

Gokhan Memik, Mahmut T. Kandemir, Alok N. Choudhary, "Exploiting Inter-File Access Patterns Using Multi-Collective I/O", FAST 2002: 245-258.

Gokhan Memik, Glenn Reinman, William H. Mangione-Smith, "Just Say No: Benefits of Early Cache Miss Determination", in Proc. of Ninth International Symposium on High Performance.Computer Architecture (HPCA), Anaheim, CA, Feb. 2003, 10 pages.

G. Memik, G. Reinman, W. H. Mangione-Smith, "Reducing Energy and Delay Using Efficient Victim Caches", in Proc. of International Symposium on Low Power Electronics and Design (ISLPED), Seoul, Korea, Aug. 2003, 262-265.

S. O. Memik, G. Memik, R. Jafari, E. Kursun, "Global Resource Sharing for Synthesis of Control Data Flow Graphs on FPGAs", in Proc. of 40th Design Automation Conference (DAC), Anaheim, CA, Jun. 2003, pp. 604-609.

Gokhan Memik and William H. Mangione-Smith, "NEPAL: A Framework for Efficiently Structuring Applications for Network Processors", in Proc. of Second Workshop on Network Processors (NP), held in conjunction with HPCA, Anaheim, CA, Feb. 2003, 13 pages.

Andreas Moshovos, Gokhan Memik, Babak Falsafi, Alok Choudhary, "JETTY: Filtering Snoops for Reduced Energy Consumption in SMP Servers", in the Proc. of Seventh International Symposium on High Performance Computer Architecture (HPCA), Monterey, Mexico, Jan. 2001, 12 pages.

(56) References Cited

OTHER PUBLICATIONS

Gokhan Memik, Mahmut T. Kandemir, Alok Choudhary, "Design and Evaluation of a Smart Disk Cluster for DSS Commercial Workloads", Journal of Parallel and Distributed Computing (JPDC), vol. 61, Issue 11, pp. 1633-1664, 2001.

Gokhan Memik, Mahmut T. Kandemir, Alok N. Choudhary, "Design and Evaluation of a Compiler-Directed Collective I/O Technique", Euro-Par 2000: 1263-1272.

S. Borkar, T. Karnik, S. Narendra, J. Tschanz, A. Keshavarzi, and V. De, "Parameter variations and impact on circuits and microarchitecture," in Design Automation Conference, Jun. 2003, pp. 338-342.

J. Dorsey, S. Searles, M. Ciraula, S. Johnson, N. Bujanos, D. Wu, M. Braganza, S. Meyers, E. Fang, and R. Kumar, "An integrated quadcore Opteron processor," in International Solid State Circuits Conference, Feb. 2007, pp. 102-103.

E. Humenay, D. Tarjan, and K. Skadron, "Impact of process variations on multicore performance symmetry," in Design, Automation and Test in Europe, Apr. 2007, pp. 1653-1658.

R. McGowen, C. A. Poirier, C. Bostak, J. Ignowski, M. Millican, W. H. Parks, and S. Naffziger, "Power and temperature control on a 90-nm Itanium family processor," Journal of Solid-State Circuits, Jan. 2006.

Alex Shye, Lei Yang, Xi Chen, Berkin Ozisikyilmaz, Arindam Mallik, Bin Lin, Peter A. Dinda, Gokhan Memik, Robert P. Dick, "Empathic Computer Architectures and Systems", in Architectural Support for Programming Languages and Operating Systems (ASPLOS)—Wild and Crazy Ideas VI (ASPLOS-WACI), Seattle, WA, Mar. 2008, 1 page.

Bloom filter "Wikipedia", Jul. 13, 2009, 10 pages.

Onur Mutlu and Thomas Moscibroda, "Parallelism-Aware Batch Scheduling: Enhancing both Performance and Fairness of Shared DRAM System," ISCA, pp. 63-74, 2008 (2008 International Symposium on Computer Architecture).

Skadron, K. et al., "Temperature-Aware Microarchitecture", Published in the Proceedings of the 30$^{th}$ International Symposium on Computer Architecture, pp. 1-12, Jun. 9-11, 2003.

Chung-Hsiang Lin, Chia-Lin Yang, Ku-Jei King, "PPT Joint performance/power/thermal management of DRAM memory for multi-core systems", Proceedings of the 14th ACM/IEEE International Symposium on Low Power, Electronics and Design (ISLPED), Aug. 2009, pp. 93-98.

Hong, S. et al., "Process Variation Aware Thread Mapping for Chip Multiprocessors", 978-3-9810801-5-5/DATE09 © 2009 EDAA, 6 pages.

Chen, R. et al., "Toward Secure Distributed Spectrum Sensing in Cognitive Radio Networks", the paper was presented in part in the First IEEE Workshop on Networking Technologies for Software Defined Radio (SDR) Networks, Sep. 2006, Reston, VA., 11 pages.

R. Chen, J.-M. Park, and K. Bian, "Robust distributed spectrum sensing in cognitive radio networks," IEEE Infocom 2008 mini-conference, Apr. 2008, 9 pages.

R. Bitirgen, E. Ipek, and J.F. Martinez, "Coordinated Management of Multiple Interacting Resources in Chip Multiprocessors: A Machine Learning Approach", Proc. of Intl. Symposium on Microarchitecture, Lake Como, Italy, Nov. 2008, 12 pages.

Chang Joo Lee, Onur Mutlu, Veynu Narasiman, and Yale N. Patt, "Prefetch-Aware DRAM Controllers", Proceedings of the 41st International Symposium on Microarchitecture (MICRO), pp. 200-209, Lake Como, Italy, Nov. 2008.

Onur Mutlu and Thomas Moscibroda, "Stall-Time Fair Memory Access Scheduling for Chip Multiprocessors", Proceedings of the 40th International Symposium on Microarchitecture (MICRO), pp. 146-158, Chicago, IL, Dec. 2007.

A. Das, S. Misra, S. Joshi, J. Zambreno, G. Memik and A. Choudhary. "An Efficient FPGA Implementation of Principal Component Analysis based Network Intrusion Detection System." In Proc. of Design, Automation & Test in Europe (DATE), Munich, Germany, Mar. 2008, pp. 1160-1165.

Arindam Mallik and Gokhan Memik, "Low Power Correlating Caches for Network Processors", Journal of Low Power Electronics (JOLPE), vol. 1, No. 2, pp. 108-118, Aug. 2005, pp. 1-21.

L. Zhang, L. Bai, R. P. Dick, L. Shang, and R. Joseph, "Process variation characterization of chip-level multiprocessors," in Proc. of Design Automation Conference (DAC), San Francisco, CA, Jul. 2009, 4 pages.

\* cited by examiner

CORE SELECTION FOR APPLICATIONS RUNNING ON MULTIPROCESSOR SYSTEMS BASED ON CORE AND APPLICATION CHARACTERISTICS

REFERENCE TO RELATED APPLICATIONS

This application is related to application Ser. No. 12/507,952, now U.S. Pat. No. 8,819,686, entitled "SCHEDULING THREADS ON DIFFERENT PROCESSING CORES BASED ON MEMORY TEMPERATURE", filed Jul. 23, 2009 and issued on Aug. 26, 2014.

BACKGROUND

As integrated-circuit technology continues to scale, process variation—the divergence of process parameters from their nominal specifications—is becoming an issue that cannot be ignored at the architecture and system levels. Indeed, variation has major implications, such as increased leakage power consumption in the chips and limited processor frequency improvements [1].

In the context of a Chip Multiprocessor (CMP) system, or components within a CMP system, within-die process variation in current and near-future technologies may cause individual cores in the chip to differ substantially in the amount of power they may consume and in the maximum frequency that they may support. This effect, which has been reported elsewhere [3] suggests that it is no longer accurate to think of large CMP systems as homogeneous systems.

BRIEF DESCRIPTION OF THE DRAWINGS

The present disclosure can be better understood from the following description and appended claims, taken in conjunction with the following drawings. The components in the figures are not necessarily to scale, emphasis instead being placed upon illustrating the principles of the disclosed subject matter. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

It is beneficial to intelligently schedule threads while considering the within-chip process variations. However, as the number of cores in a chip increases, determining which core would effectively execute a given thread becomes a complicated task.

As contemplated here, within-die process variations may cause individual cores in a CMP system to differ in both static power consumed and maximum frequency supported. Similarly, within-die process variation may cause components within individual cores in a CMP system to differ in both static power consumed and maximum frequency supported. In this environment, ignoring variation effects when scheduling applications or when scheduling threads from applications may be suboptimal.

Within-die process variation may cause components within individual cores, known as core components, to fail or to provide suboptimal performance. Core component may include, for example, a branch predictor, cache, a floating point unit, a specific type of bus such as a memory bus, and a forwarding circuit used in pipeline designs, a register file, or an instructions queue. If a core component fails or provides suboptimal performance, it may slow down the performance of a CMP system.

In these environments, ignoring the effects of within-die process variation may result in suboptimal performance of the entire CMP system. Some hardware components may be available which may be used in determining the effects of within-die process variation within a certain core. Indeed, sophisticated on-chip power monitors and controllers such as those in Intel's Foxton technology [4] may be used to measure and manage the power heterogeneity of the cores. Moreover, the ability to support multiple on-chip frequency domains and change the frequency of each core independently as in AMD's Quad-Core Opteron [2] may be used to exploit the frequency heterogeneity of the cores.

As a result, the present disclosure identifies that it may be advantageous to be aware of within-die process variations within a CMP system or within various core components within a CMP system and to schedule applications, or threads within an application, to save power or improve throughput. By scheduling applications in a variation-aware manner, taking into account the different power and frequency characteristics of each individual core, or by taking into account within-die process variation for core components within a specific core or cores, substantial savings in power or substantial increases in throughput may be attainable.

Figure 1:
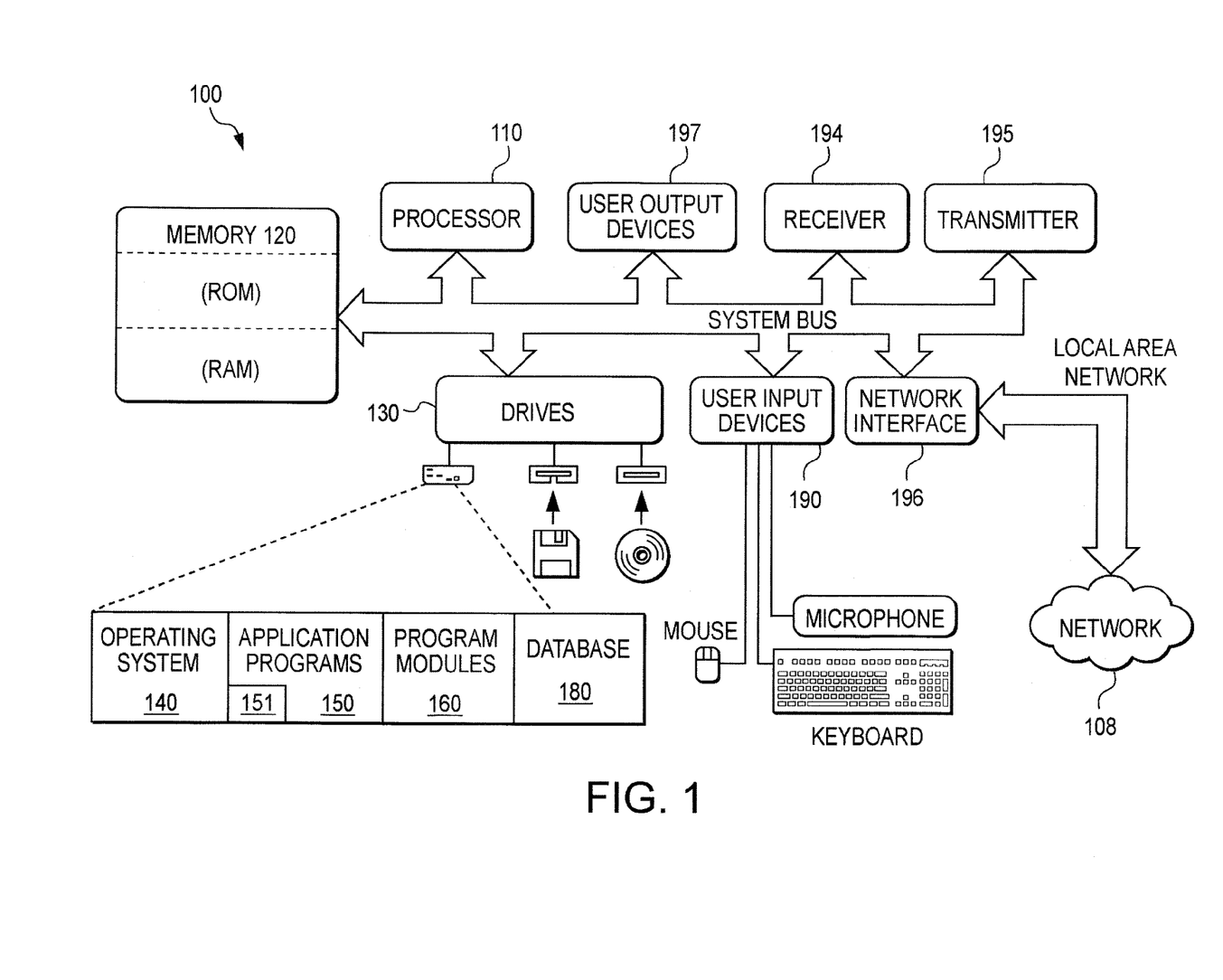
FIG. 1 illustrates a computer system according to at least some embodiments of the present disclosure.

FIG. 1 illustrates a computer system arranged according to at least some embodiments of the present disclosure. FIG. 1 illustrates a computer 100 including a processor 110, memory 120 and one or more drives 130. The drives 130 and their associated computer storage media may provide storage of computer readable instructions, data structures, program modules and other data for the computer 100. Drives 130 may include an operating system 140, application programs 150, program modules 160, and database 180. Operating system 140 and/or application programs 150, for example, may include program instructions for causing the computer 100 to carry out the functions and/or operations specified in FIG. 4. Computer 100 may include user input devices 190 through which a user may enter commands and data. Input devices may include an electronic digitizer, a microphone, a keyboard and pointing device, commonly referred to as a mouse, trackball or touch pad. Other input devices may include a joystick, game pad, satellite dish, scanner, or the like.

These and other input devices may be coupled to processor 110 through a user input interface that may be coupled to a system bus or it may be connected by other interface or bus structures, such as a parallel port, game port or a universal serial bus (USB), or the like. Computer 100 may include peripheral output devices such as speakers, a printer, or a display 202, which may be connected through an output peripheral interface 194 or the like.

Computer 100 may operate in a networking environment using logical connections to one or more computers, such as a remote computer connected to network interface 196 The remote computer may be a personal computer, a server, a router, a network PC, a peer device or other common network node, and may include many or all of the elements described above relative to computer 100.

Networking environments may include offices, enterprise-wide area networks (WAN), local area networks (LAN), intranets and the Internet. In an example, computer 100 may be the source machine from which data is being migrated and the remote computer may comprise the destination machine, or vice versa. Source and destination machines may not be connected by a network 108 or any other means, but instead, data may be migrated via any media capable of being written by the source platform and read by the destination platform or platforms. In a LAN or WLAN networking environment, computer 100 may be connected to the LAN or WAN through a network interface 196 or an adapter. In a WAN networking environment, computer 100 may include a modem or other means for establishing communications over the WAN, such as the Internet or network 108. Other means of establishing a communications link between the computers may be used.

A computer peripheral may include any device coupled to the processor 110 and the memory 120 of the computer 100 through the system bus. A computer peripheral may include any device connected with the output peripheral interface, including the display 202, the printer, or speakers, drives 130, user input devices 190 such as the keyboard, the mouse, and the microphone, and the network interface 196. Components of the computer peripheral may include any device within a computer peripherals which may use power and may be any device, such as speakers, lighting elements such as light emitting diodes, or backlights used to provide lighting for displays, display elements, such as LCD, LED, OLED, CRT, or Plasma displays, or semiconductor chips such as a central processing unit (CPU), a graphic processing unit (GPU), memory. According to an embodiment, computer 100 may be connected in a networking environment such that the processor 110 and/or program modules 160 may perform power reduction and conservation with minimal detriment to the user experience.

In some examples, methods for scheduling an application program running in a computer system are described. The computer system may include a multiprocessor having first and second cores and an operating system running the application program. The first core may have first and second core components of first and second core component types, respectively. The second core may have third and fourth core components of first and second core component types, respectively. The method may include analyzing the first, second, third, and fourth core components for any within-die process variation, and determining the operating states of the first, second, third and fourth core components. The method may include selecting optimum core components for each component type and determining which core component types are used by the application program. The method may include scheduling the application program to run on the core having an optimum core component for a core component type used by the application program.

In some other examples, methods for scheduling a plurality of application programs running in a computer system are described. The computer system may include a multiprocessor having first and second cores and an operating system running the application programs. The first core may have first and second core components of first and second core component types, respectively. The second core may have third and fourth core components of first and second core component types, respectively. The method may include determining the operating states of the first, second, third and fourth core components, and selecting optimum core components for each component type. The method may include determining which core components types are used by each application program, and scheduling each application program to run on a core having an optimum core component for a core component type used by each application program.

In still other examples, method for scheduling an application program running in a computer system are described. The computer system may include first and second cores and an operating system running the application program. The first core may have first and second core components of first and second core component types, respectively. The second core may have third and fourth core components of first and second core component types, respectively. The method may include determining the operating states of the first, second, third and fourth core components, and determining which core component types are used by each application program. The method may include scheduling the application program to run on a core having an optimum core component for a core component type used by the application program.

Figure 2:
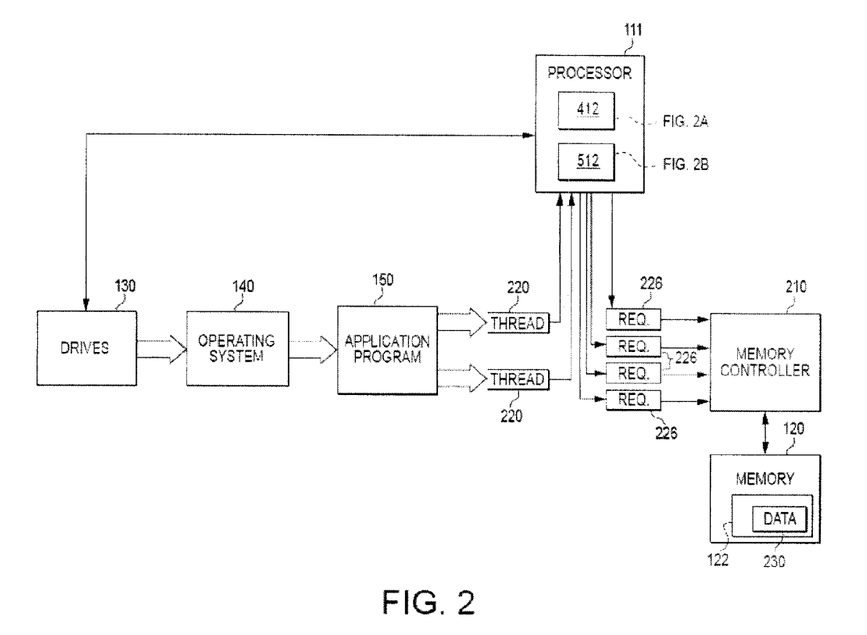
FIG. 2 illustrates an application program being executed by an operating system in accordance with at least some embodiments of the present disclosure, including a detailed view of each core of a multiprocessor in FIG. 2A and FIG. 2B.

FIG. 2 illustrates an application program being executed by an operating system in accordance with at least some embodiments of the present disclosure. As shown in FIG. 2, operating system 140 may execute an application program 150 from drives 130. Operating system 140 and/or application programs 150, for example, may include program instructions for causing the computer 100 to carry out the functions and/or operations specified in FIG. 4. Application program 150 may be any application, program, portion of a program, or thread, which may be executed by operating system 140 in multiprocessor 111. Application program 150 may load data 230 into memory 120 and accesses data 230 from memory 120 using a memory controller 210. Application program 150 may run multiple sub-applications called threads 220 to accomplish a task, such as loading and accessing data 230 into and from memory bank 122 of memory 120 using one or more requests 226. Threads 220 may be executed by application program 150. Application program 150 may divide the execution of a task into as many threads 220 as application programs deems necessary to accomplish that task. For example, if application program 150 is a word processing program with a document having multiple pages, and application program 150 is configured to accomplish the task of spell checking each page of the document, application program 150 may divide the task of spell checking the document into multiple threads 220 such that each thread 220 may spell check a portion of the document. Each thread 220 may be sent to multiprocessor 111 for execution. When executed within the multiprocessor 111, each thread 220 may produce requests 226 for data 230 within memory 120. The requests 226 may be sent to memory controller 210, which may organize the requests 226 so that multiprocessor 111 may operate efficiently.

In some embodiments, as shown in FIG. 2, multiprocessor 111 may include processors that may simultaneously execute more than one thread 220. Multiprocessor 111 may include multiple processors known as cores 412 and 512, or a single processor (only one of 412 or 512) which may run multiple threads 220 simultaneously, also known as a multithreaded processor. FIG. 2 illustrates an example multiprocessor 111 including two cores 412 and 512, but is not limited to any particular number of cores. The term "core" is used herein to refer to any device which may process a single thread and may refer to a processor or a portion within a processor that may process a single thread. A multithreaded processor may be referred to as a processor having multiple cores. A computer 100 having multiple processors may be referred to herein as a computer 100 having multiple cores.

Figure 2A:
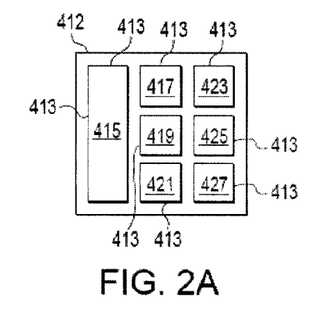
Figure 2B:
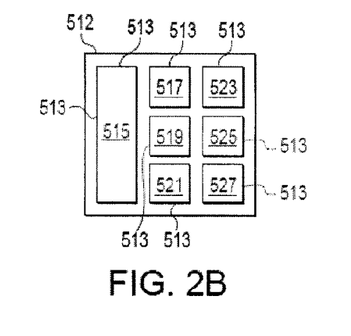

FIG. 2A and FIG. 2B include a detailed view of multiprocessor 111, showing details of the cores 412 and 512, respectively. As shown, each core 412 or 512, may include core components 413 or 513, which may be elements within each core that may perform a set function or operation for the core. There may be varying types of core components 413 or 513, also known as core component types, which may include, for example, a branch predictor (415 or 515), cache (417 or 517), a floating point unit (419 or 519), a specific type of bus (421 or 521) such as a memory bus, or a forwarding circuit (423 or 523) used in pipeline designs, a register (425 or 525), or an instructions queue (427 or 527). If a core component 413 or 513 fails or provides suboptimal performance, it may slow down the performance of the core, and ultimately the multiprocessor 111. Furthermore, a core 412 may have, for example, a branch predictor 415, which may perform faster than a branch predictor 515 of a core 512. In such an example, an application program 150 which requires heavy use of a branch predictor, may perform better on the first core 412 than the second core 512.

Figure 3:
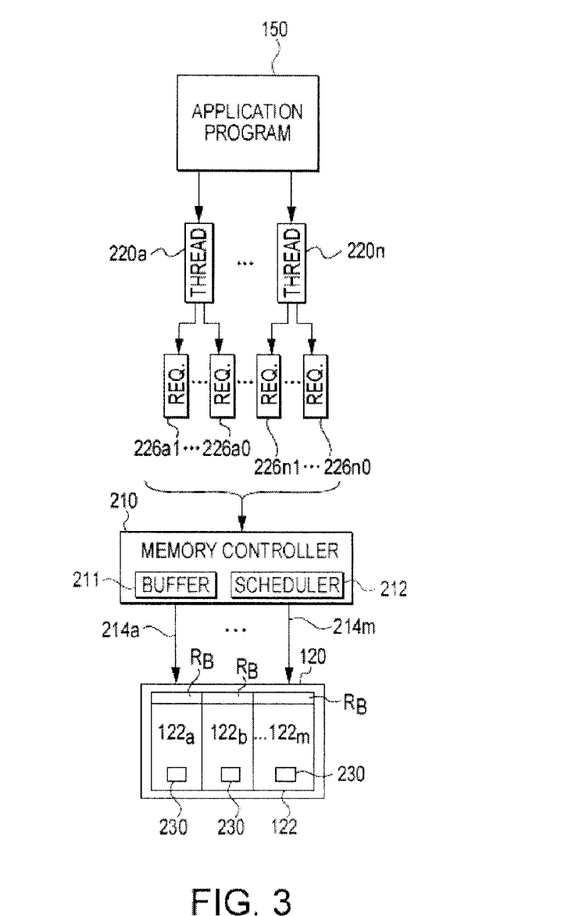
FIG. 3 illustrates a schematic representation of an application program being divided into threads which issue requests sent to a memory controller in accordance with at least some embodiments of the present disclosure.

FIG. 3 illustrates a schematic representation of an application program being divided into threads which issue requests sent to a memory controller in accordance with at least some embodiments of the present disclosure. As shown in FIG. 3, application 150 may be divided into multiple threads $220_a$-$220_n$, where n may represent the number of threads 220, and wherein each thread may perform a task for application 150 and may be executed on, for example, multiprocessor 111 of FIG. 2. The multiprocessor may be configured to receive and execute multiple threads $220_a$-$220_n$, individually or simultaneously, from application program 150. Each thread 220 executed on the multiprocessor may be executed independently from each other thread 220 and may issue multiple requests $226_{a1}$-$226_{no}$ for data 230 stored in memory 120, where the first index (a . . . n) represents the thread 220 associated with the request 226, and the second index (1 . . . o) represents the number of requests 226 associated with a particular thread 220.

Each core component 413 or 513 shown in FIG. 2A and FIG. 2B, when manufactured, may suffer from some degree of process variation, which may cause the core components to fail or to provide suboptimal performance. Process variation may refer to changes in semiconductor processing related parameters (e.g., parameters related to doping density, mobility, resistance, capacitance, inductance, gain, speed, bandwidth, threshold voltage, parasitic effects, leakage, etc.) beyond their nominal values and may result from manufacturing difficulties at small feature sizes, for example. For the purposes of modeling and analysis, variation may be broken down into die-to-die (D2D) variation (or core-to-core variation) and within-die (WID) variation (or within-core variation). WID process variation may be further divided into systematic and random effects. WID process variation may have a direct effect on core-to-core variation in power and frequency within a computer.

Example semiconductor processing parameters that may be affected by WID process variation, include, for example, threshold voltage ($V_{th}$) and effective gate length ($L_{eff}$). These example parameters may impact a transistor's switching speed and leakage power. Higher $V_{th}$ and $L_{eff}$ variation may correspond to higher variation in transistor speed (or bandwidth) across the chip. This may result in slower processors (or multiprocessors) or slower core components since the slower transistors within the processor or core components may determine the frequency of the processor or the performance of the core components within the processor. In a multiprocessor 111, different cores may support different frequencies and different core components within cores may have varying performance. Also, as $V_{th}$ varies, transistor leakage may vary across the processor or multiprocessor. Low-$V_{th}$ transistors may consume more power than high-$V_{th}$ transistors save. As a result, with variation, processors and multiprocessors may consume substantially more leakage power. In a multiprocessor, different cores may have varying amounts of transistor leakage.

To model systematic variation, the processor or multiprocessor, or individual core components within a processor or multiprocessor, may be divided into a grid. Each grid point may be given one value of the systematic component of the parameter, which may be assumed to have a normal distribution with $\mu=0$ and standard deviation $\sigma_{sys}$. Systematic variation may be characterized by a spatial correlation, so that adjacent areas on a chip may have roughly the same systematic component values.

Random variation may occur at the level of individual transistors and it may be modeled analytically with a normal distribution with $\mu=0$ and standard deviation $\sigma_{ran}$. Since the random and systematic components may be normally distributed and independent, their effects may be additive.

In an environment with process variation, each processor core in a multiprocessor may consume a different amount of power and may support a different maximum frequency, resulting in variations in performance from one core to another. Additionally, each core component within a processor (or multiprocessor) core may consume a different amount of power and may support a different maximum frequency, resulting in variations in performance from one core to another. Moreover, certain core components may completely fail or perform in a suboptimal manner. As a result, cores having core components which fail or provide suboptimal performance may not perform certain application programs as efficiently as other application programs which rely more on those core components.

Figure 4:
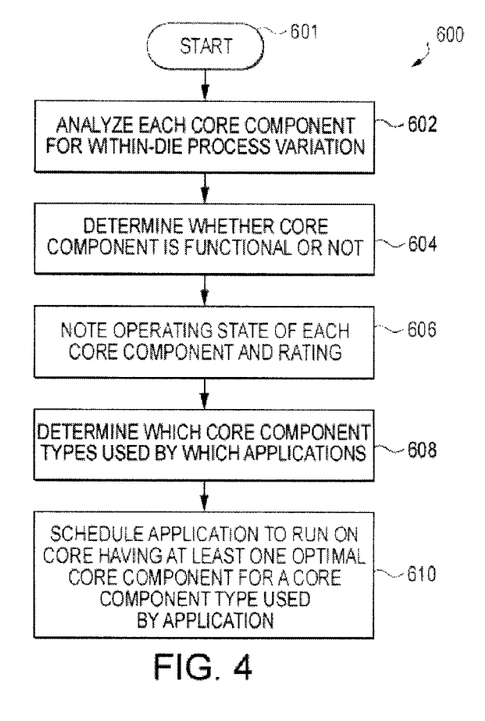
FIG. 4 illustrates a flowchart arranged in accordance with at least embodiments of the present disclosure.

In various described embodiments, applications may be scheduled using an application scheduling algorithm, such as that described in FIG. 4, to maximize the performance of the multiprocessor or minimize the power usage of the multiprocessor, substantially as if the variation-affected multiprocessor was a heterogeneous system. In this environment, there may be two high-level design issues. The first may be whether the different cores of the multiprocessor may have to cycle at the same frequency (Uniform Frequency) or not (Non-Uniform Frequency). The second may be whether the frequency and voltage of the cores of the multiprocessor may be changed dynamically (DVFS) or not (no DVFS). For these configurations, the operating system or application programs may include a variation-aware application scheduling algorithm for application scheduling and power management to minimize power or maximize performance. The application scheduling algorithms may complement the other scheduling criteria that may be used by the operating system, such as priority, fairness, or starvation-avoidance. More information regarding application scheduling algorithms can be found in Radu Teodorescu and Joseph Torrellas, "Variation-Aware Application Scheduling and Power Management for Chip Multiprocessors," 2008 International Symposium on Computer Architecture (ISCA), pp. 363-374, 2008, all of which is incorporated by reference herein, except where inconsistent with the present application.

FIG. 4 illustrates a flowchart arranged in accordance with at least some embodiments of the present disclosure. Referring to FIG. 4, to improve the performance or minimize power usage characteristics of each individual core, application programs may be scheduled to run in a variation-aware manner on specific cores or core components by the operating system using an application scheduling algorithm 600. Application scheduling algorithm 600 may take into account process variation for core components within a specific core or cores, and may allow for substantial savings in power or substantial increases in throughput when operating application programs.

In use, the operating system and/or an application program may activate the application scheduling algorithm 600 at block 601, and application scheduling algorithm 600 may be arranged to analyze core components within each core of a multiprocessor for process variation, at block 602. When analyzing core components for process variation, the application scheduling algorithm 600 may be configured to determine whether the core component is functional or not, at block 604. If the core component is determined to be functional, the application scheduling algorithm 600 may be arranged to examine within-die process variation and/or die-to-die process variation and determine how well the core component functions when compared with other core components of the same type. In an example, if application scheduling algorithm 600 determines that a particular branch predictor is functional, it may compare the performance of that branch predictor to the performance of other branch predictors, or to that of a predetermined series measurements, such as average operating voltages and/or average operating frequencies for similar branch predictors. Upon comparing the performance of a core component to that of another core components of the same type, the application scheduling algorithm 600 may be arranged to note (e.g., record or store) the operating state of the core component as functional or non-functional and, if functional, the application scheduling algorithm 600 may be arranged to rate (e.g., rank or score) how well the core component functions, with regard to performance or power efficiency, for example, at block 606. The rating of how well the core component functions may be on a scale, such as a scale from 1.0 to 10.0, or any other reasonable scale.

Upon noting and rating each core component, application scheduling algorithm 600 may be arranged to determine which core components types may be used by each application program running on the operating system, or which core component types may be important for each application program, at block 608; this may take place during the compilation of the application. The compiler may generate information that describes which components are used by each application or thread. The algorithm 600 may schedule each application program to run on a core having at least one optimal core component of a core component type used by the application program, at block 610. An optimal core component may be a core component which may be functional and may have a functional operating state. In an example, an optimal core component may be a core component which may have an operating state having the highest ranking. In another example, an optimal core component may be a core component which may have an above average ranking. In an embodiment, application scheduling algorithm 600 may schedule the application program to run on a core having the most optimal core components of a core component types used by the application program.

The application scheduling algorithm 600 may determine which application program is scheduled to run on which core. For example, each core component may be labeled, such as a branch predictor may be labeled 1, a floating-point multiplier may be labeled 2, an integer multiplier may be labeled 3, etc. For each core, there may be a separate bloom filter, with each bloom filter storing the label(s) of the core components which are failing on the associated core. For example, if the branch predictor of a particular core is failing, then the associated bloom filter may include element 1, since 1 is the label of the branch predictor. When an application (or thread) is to be scheduled, the application scheduling algorithm 600 may check whether there is a match between the application requirement and capability of a particular core. For example, if the application requires a floating-point multiplier, it may check the bloom filters of individual cores and see whether they contain the element 2 (corresponding to the floating-point multiplier label). If the bloom filter table contains the element, the application may be scheduled on another core. If it does not, that core may be used for the application.

In various embodiments, the disclosed methods may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the disclosed subject matter may be implemented as a combination of both software (e.g., a computer program product) and hardware. Still other embodiments of the disclosed subject matter are implemented as entirely hardware, or entirely software (e.g., a computer program product).

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various embodiments of the disclosed subject matter have been described, it will be apparent to those of ordinary skill in the art that other embodiments and implementations are possible within the scope of the disclosure. Accordingly, the disclosed subject matter is not to be restricted except in light of the attached claims and their equivalents.

REFERENCES

[1] S. Borkar, T. Karnik, S. Narendra, J. Tschanz, A. Keshavarzi, and V. De, "Parameter variations and impact on circuits and microarchitecture," in Design Automation Conference, June 2003.

[2] J. Dorsey, S. Searles, M. Ciraula, S. Johnson, N. Bujanos, D. Wu, M. Braganza, S. Meyers, E. Fang, and R. Kumar, "An integrated quadcore Opteron processor," in International Solid State Circuits Conference, February 2007.

[3] E. Humenay, D. Tarjan, and K. Skadron, "The impact of systematic process variations on symmetrical performance in chip multiprocessors," in Design, Automation and Test in Europe, April 2007.

[4] R. McGowen, C. A. Poirier, C. Bostak, J. Ignowski, M. Millican, W. H. Parks, and S. Naffziger, "Power and temperature control on a 90-nm Itanium family processor," Journal of Solid-State Circuits, January 2006.

The invention claimed is:

1. A method to schedule an application program running in a computer system that includes two or more cores, each respective core effective to use respective core components, wherein the core components are elements within the cores that perform a function or operation for the cores, the method comprising:

analyzing a first core component to determine a first operating state of the first core component, wherein the first core component is of a component type among a group of component types including a branch predictor, a cache, a floating point unit, a bus, a forwarding circuit, a register file, and an instructions queue, and the component type is manufactured to function at a nominal value that is determined according to a manufacturing process for the component type;

storing the first operating state in a bloom filter;

based on the stored first operating state, producing a first rating that represents a first performance value of the first core component, wherein the first core component is caused, by a process variation, to perform the function or operation at the first performance value, instead of the nominal value, the process variation includes a core-to-core process variation and is associated with the manufacturing process for the component type;

analyzing a second core component to determine a second operating state of the second core component, wherein the second core component is of the component type;

storing the second operating state in the bloom filter;

based on the stored second operating state, producing a second rating that represents a second performance value of the second core component, wherein the second core component is caused, by the process variation, to perform the function or operation at the second performance value, instead of the nominal value;

selecting the first core component over the second component, to be used on a core to run the application program, in response to the first rating being greater than the second rating, wherein the first rating is greater than the second rating in response to the first performance value being closer to the nominal value than the second performance value; and in response to the selection of the first core component, scheduling the application program to run on the core with use of the first core component.

2. The method of claim 1, further comprising determining an application core component type used by the application program, wherein the application core component type is the component type.

3. The method of claim 1, wherein analyzing the first and second core components comprises ranking each of the first and second core components based on the first and the second performance values to respectively produce the first and second ratings.

4. The method of claim 1, wherein the component type includes a first component type, the nominal value includes a first nominal value and the process variation is includes a first process variation, the method further comprising:

analyzing a third core component to determine a third operating state of the third core component, wherein the third core component is of a second component type among the group of component types, and the second component type is manufactured to perform the function or operation at a second nominal value that is determined according to a manufacturing process for the second component type;

storing the third operating state in the bloom filter;

based on the stored third operating state, producing a third rating that represents a third performance value of the third core component, wherein the third core component is caused, by a second process variation, to perform the function or operation at the third performance value, instead of the second nominal value;

analyzing a fourth core component to determine a fourth operating state of the fourth core component;

storing the fourth operating state in the bloom filter;

based on the stored fourth operating state, producing a fourth rating that represents a fourth performance value of the fourth core component, wherein the fourth core component is caused, by the second process variation, to function at the fourth performance value, instead of the second nominal value;

selecting the third core component over the fourth component, to be used on the core to run the application program, in response to the third rating being greater than the fourth rating, wherein the third rating is greater than the fourth rating in response to the third performance value being closer to the second nominal value than the fourth performance value; and in response to the selection of the third core component, scheduling the application program to run on the core, wherein the core is effective to use the third core component.

5. The method of claim 4, further comprising determining first and second application core component types used by the application program, wherein the first and second application core component types include the first component type and the second component type.

6. The method of claim 4, wherein the analyzing the third and fourth core components comprises ranking each of the third and fourth core components based on the third and fourth performance values.

7. The method of claim 4, wherein the first and third core components are on different cores.

8. The method of claim 1, wherein analyzing the first and second core components comprises ranking each of the first and second core components based on power efficiency of the first and second core components to respectively produce the first and second ratings.

9. The method of claim 1, wherein scheduling the application program to run on the core with use of the first core component comprises scheduling the application program to run on the first core component on the scheduled core.

10. A computer program product comprising computer-readable instructions encoded in non-transitory computer-readable media, to schedule an application program that runs in a computer system having two or more cores, each respective core effective to use respective core components, wherein the core components are elements within the cores that perform a function or operation for the respective cores, the computer-readable instructions, operable, in response to execution by a processor, to:

analyze a first core component to determine a first operating state of the first core component, wherein the first core component is of a component type among a group of component types including a branch predictor, a cache, a floating point unit, a bus, a forwarding circuit, a register file, and an instructions queue, and the component type is manufactured to perform the function or operation at a nominal value that is determined according to a manufacturing process for the component type;

store the first operating state in a data structure;

based on the stored first operating state, produce a first rating that represents a first performance value of the first core component, wherein the first core component is caused, by a process variation, to perform the function or operation for the respective core at the first performance value, instead of the nominal value, the process variation includes a core-to-core process variation, and the process variation is associated with the manufacturing process for the component type;

analyze a second core component to determine a second operating state of the second core component, wherein the second core component is of the component type;

store the second operating state in the data structure;

based on the stored second operating state, produce a second rating that represents a second performance value of the second core component, wherein the second core component is caused, by the process variation, to perform the function or operation for the respective core at the second performance value, instead of the nominal value;

select the first core component over the second component, to be used on a core to run the application program, in response to the first rating being greater than the second rating, wherein the first rating is greater than the second rating in response to the first performance value being closer to the nominal value than the second performance value; and in response to the selection of the first core component, schedule the application program to run on the core with use of the first core component.

11. The computer program product of claim 10, further comprising computer-readable instructions, operable in response to execution by the processor, to determine an application core component type used by the application program, wherein the application core component type includes the component type.

12. The computer program product of claim 10, wherein the data structure includes a bloom filter.

13. The computer program product of claim 10, wherein the component type is a first component type, the nominal value is a first nominal value and the process variation is a first process variation, the computer program product further comprising computer-readable instructions, operable in response to execution by the processor to:

analyze a third core component to determine a third operating state of the third core component, wherein the third core component is of a second component type among the group of component types, and the second component type is manufactured to function at a second nominal value that is determined according to a manufacturing process for the second component type;

store the third operating state in the data structure;

based on the third operating state, produce a third rating represents a third performance value of the third core component, wherein the third core component is caused, by a second process variation, to perform the function or operation at the third performance value, instead of the second nominal value;

analyze a fourth core component to determine a fourth operating state of the fourth core component, wherein the fourth core component is of the second component type;

store the fourth operating state in the data structure;

based on the stored fourth operating state, produce a fourth rating that represents a fourth performance value of the fourth core component, wherein the fourth core component is caused, by the second process variation, to perform the function at the fourth performance value, instead of the second nominal value;

select the third core component over the fourth component, to be used on the core to run the application program, in response to the third rating being greater than the fourth rating, wherein the third rating is greater than the fourth rating in response to the third performance value being closer to the second nominal value than the fourth performance value; and in response to the selection of the third core component, schedule the application program to run on the core, wherein the core is effective to use the third core component.

14. The computer program product of claim 13, wherein the first and third core components are on different cores.

15. A computer system, comprising:

two or more cores, each of the two or more cores effective to use core components of first and second component types among a group of component types including a branch predictor, a cache, a floating point unit, a bus, a forwarding circuit, a register file, and an instructions queue, wherein the core components are elements within the cores that perform a function or operation for the cores; and non-transitory computer-readable media, operably coupled to the two or more cores, wherein the non-transitory computer-readable media includes computer-readable instructions which, in response to execution by the computer system, cause the computer system to:

analyze a first core component to determine a first operating state of the first core component, wherein the first core component is of the first component type and the first component type is manufactured to function at a nominal value that is determined according to a manufacturing process for the component type;

store the first operating state in a data structure;

based on the stored first operating state, produce a first rating that represents a first performance value of the first core component, wherein the first core component is caused, by a process variation, to perform the function or operation for a respective core at the first performance value, instead of the nominal value, the process variation includes a core-to-core process variation, and the process variation is associated with the manufacturing process for the component type;

analyze a second core component to determine a second operating state of the second core component, wherein the second core component is of the first component type;

store the second operating state in the data structure;

based on the stored second operating state, produce a second rating that represents a second performance value of the second core component, wherein the second core component is caused, by the process variation, to perform the function or operation for the respective core at the second performance value, instead of the nominal value;

select the first core component over the second component, to be used on a core to run the application program, in response to the first rating being greater than the second rating, wherein the first rating is greater than the second rating in response to the first performance value being closer to the nominal value than the second performance value; and in response to the selection of the first core component, schedule the application program to run on the core with use of the first core component.

16. The computer system of claim 15, wherein the nominal value includes a first nominal value, the process variation includes a first process variation, and the non-transitory computer-readable media further includes computer-readable instructions which, in response to execution by the computer system, further cause the computer system to:

analyze a third core component to determine a third operating state of the third core component, wherein the third core component is of the second component type among the group of component types, and the second component type is manufactured to function at a second nominal value that is determined according to a manufacturing process for the second component type;

store the third operating state in the data structure;

based on the stored third operating state, produce a third rating that represents a third performance value of the third core component, wherein the third core component is caused, by a second process variation, to perform the function or operation at the third performance value, instead of the second nominal value;

analyze a fourth core component to determine a fourth operating state of the fourth core component, wherein the fourth core component is of the second component type;

store the fourth operating state in the data structure;
based on the stored fourth operating state, produce a fourth rating that represents a fourth performance value of the fourth core component, wherein the fourth core component is caused, by the second process variation, to perform the function or operation at the fourth performance value, instead of the second nominal value;
select the third core component over the fourth component, to be used on the core to run the application program, in response to the third rating being greater than the fourth rating, wherein the third rating is greater than the fourth rating in response to the third performance value being closer to the second nominal value than the fourth performance value; and
in response to the selection of the third core component, schedule the application program to run on the core, wherein the core is effective to use the third core component.

* * * * *

UNITED STATES PATENT AND TRADEMARK OFFICE
CERTIFICATE OF CORRECTION

PATENT NO.        : 8,924,975 B2                                Page 1 of 1
APPLICATION NO.   : 12/508552
DATED             : December 30, 2014
INVENTOR(S)       : Memik et al.

It is certified that error appears in the above-identified patent and that said Letters Patent is hereby corrected as shown below:

Title Page

On Page 2, in item (56), under "OTHER PUBLICATIONS", in Column 2, Line 55, delete "Managerment" and insert -- Management --, therefor.

On Page 4, in item (56), under "OTHER PUBLICATIONS", in Column 1, Line 56, delete "and.Computer" and insert -- and Computer --, therefor.

On Page 4, in item (56), under "OTHER PUBLICATIONS", in Column 2, Line 55, delete "Performance.Computer" and insert -- Performance Computer --, therefor.

Signed and Sealed this
Sixteenth Day of June, 2015

Michelle K. Lee
*Director of the United States Patent and Trademark Office*